(12) United States Patent
Plaver

(10) Patent No.: US 9,410,012 B2
(45) Date of Patent: *Aug. 9, 2016

(54) THERMALLY STABLE FLAME RESISTANT FLEXIBLE POLYURETHANE FOAM

(75) Inventor: F Michael Plaver, Midland, MI (US)

(73) Assignee: Dow Global Technologies LLC, Midland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 14/125,429

(22) PCT Filed: Jun. 12, 2012

(86) PCT No.: PCT/US2012/042053
§ 371 (c)(1),
(2), (4) Date: Dec. 11, 2013

(87) PCT Pub. No.: WO2013/003027
PCT Pub. Date: Jan. 3, 2013

(65) Prior Publication Data
US 2014/0117271 A1    May 1, 2014

Related U.S. Application Data

(60) Provisional application No. 61/502,546, filed on Jun. 29, 2011.

(51) Int. Cl.
```
C08G 18/32     (2006.01)
C08G 18/48     (2006.01)
C08J 9/00      (2006.01)
C08G 18/66     (2006.01)
C08G 101/00    (2006.01)
```

(52) U.S. Cl.
CPC ............ *C08G 18/32* (2013.01); *C08G 18/4841* (2013.01); *C08G 18/6674* (2013.01); *C08J 9/0038* (2013.01); *C08J 9/0066* (2013.01); *C08G 2101/0008* (2013.01); *C08G 2101/0058* (2013.01); *C08G 2101/0083* (2013.01); *C08G 2350/00* (2013.01); *C08J 2375/04* (2013.01)

(58) Field of Classification Search
CPC .................................................. C08G 18/4841
See application file for complete search history.

(56) References Cited

U.S. PATENT DOCUMENTS

| 4,977,194 | A | * | 12/1990 | Haas et al. | 521/99 |
| 5,132,333 | A | * | 7/1992 | Burkhart et al. | 521/117 |
| 5,563,221 | A | * | 10/1996 | Pazos | 525/409 |
| 6,316,514 | B1 | * | 11/2001 | Falke et al. | 521/174 |
| 2004/0254256 | A1 | * | 12/2004 | Lockwood | C08G 18/1833 521/174 |
| 2012/0108690 | A1 | * | 5/2012 | Klesczewski et al. | 521/106 |
| 2013/0225705 | A1 | * | 8/2013 | Plaver et al. | 521/106 |
| 2014/0141161 | A1 | * | 5/2014 | Bruchertseifer | 427/209 |

FOREIGN PATENT DOCUMENTS

| JP | 2006083208 A | * | 3/2006 | |
| WO | WO2011003590 A2 | * | 1/2011 | C08G 18/48 |
| WO | WO 2011003590 A2 | * | 1/2011 | |

OTHER PUBLICATIONS

Dow Polyurethanes—Polyol Manufacturing. Dow Answer Center. Oct. 2014.*

* cited by examiner

*Primary Examiner* — Mike M Dollinger
*Assistant Examiner* — Christina Wales

(57) ABSTRACT

The present invention relates to a reactive formulation used to make a flame resistant flexible polyurethane foam which is particularly suited for use in under the hood vehicle applications. In particular, the flame resistant flexible polyurethane foam is made from a reactive formulation comprising an A side comprising (i) an organic isocyanate and a B side comprising (ii) an isocyanate-reactive component, (iii) a flame retardant component comprising a combination of red phosphorus, expandable graphite, and optionally sodium citrate wherein the resulting foam achieves after heat aging at 150° C. for seven days a V-0 rating at 0.5 inch according to Underwriters' Laboratories Standard 94 Flammability Test.

8 Claims, No Drawings

THERMALLY STABLE FLAME RESISTANT FLEXIBLE POLYURETHANE FOAM

FIELD OF THE INVENTION

The present invention relates to a composition for a flame resistant flexible polyurethane foam which is useful in under the hood vehicle applications which require sound deadening and vibration management. Said foam is particularly suitable for such applications because desirable flame resistant properties are achieved after exposure to heat over an extended period of time.

BACKGROUND OF THE INVENTION

Noise and vibration management is a significant issue for vehicle manufacturers, as cabin noise is a major factor in the comfort experience of automotive passengers. Therefore, noise and vibration abatement measures are routinely incorporated into motor vehicles. These abatement measures often utilize flexible polyurethane foams. However, such foams typically are called upon to perform one or more functional purpose that can not be compromised at the expense of noise and vibration absorption, for example, under the hood applications require a high degree of flame resistance, in some cases an Underwriters' Laboratories Standard 94 (UL 94) V-0 rating.

The use of fire retardants in polyurethane foams is well known. Methods of imparting flame retardancy that combine calcium carbonate, ammonium hydroxide, or another such inorganic compound, halophosphoric acid compound, melamine, or another such compound with a polyol are also known. However, a large amount of such a compound must be added to impart flame retardancy often resulting in considerable problems in relationship to the properties, moldability, economics, and the like.

Methods of making flame retardant flexible polyurethane foam can also include adding a halogenated phosphoric acid ester as a flame retardant to a composition for polyester-based polyurethane foam and using a reactive flame retardant that adds a phosphorus or halogen atom to the polyhydroxyl compound or organic polyisocyanate that is a raw material of the polyurethane foam. However, the urethane foam obtained by these methods discolor over time, the foam itself deteriorates, and adequate flame retardancy is not maintained over an extended period of time because the flame retardant volatilizes.

Due to recent environmental and market trends, non-halogenated flame retardant solutions have been pursued. For example, U.S. Pat. No. 6,765,034 discloses a flame resistant flexible polyurethane composition for use in sound deadening and vibration applications that comprises no flame retardants and relies on the selection of a specific isocyanate mixture and polyol. Furthermore, the flammability of said foams is defined only in regard to FMVSS302 flammability test, which is a less stringent flammability test as compared to the UL 94 test. FMVSS (Federal Motor Vehicle Safety Standard) 302 is a horizontal flame test which relates to a material's tendency to melt (therefore not spreading flame) as opposed to UL 94 vertical flame test which describes a material's ability to resist combustion.

US Patent Publication 20030130365 describes a process to make a flexible polyurethane foam from a rigid polyurethane foam comprising an organic phosphate flame retardant in combination with expandable graphite. However, said process is a multi-step process requiring a crushing step and a heating step. Furthermore, said polyurethane foams are evaluated by the less stringent flame spread FMVSS 302 test with no mention of UL 94 combustion resistance performance.

U.S. Pat. No. 5,169,876 discloses a flexible polyurethane foam comprising very high levels (20 to 50 weight percent) of expandable graphite incorporated into the cell walls which meet UL 94 V-0. However, the process requires a heated split stream polyol addition wherein one stream contains the expandable graphite. The high levels of expandable graphite and complex process steps contribute to an expensive product and may negatively affect the resultant foam properties, such as tensile strength.

JP 1998147623 discloses a flexible polyurethane foam with a complex flame retardant mixture comprising ammonium polyphosphate, red phosphorus and expandable graphite. However, to meet UL 94 V-2 or V-0 requirements, said foams require from 4 to 9 times the amount of ammonium polyphosphate as compared to the amount of red phosphorus.

There exists an unmet need for a flame resistant flexible polyurethane foam composition for sound deadening and vibration applications which meets UL 94 V-0 requirements, especially after exposure to elevated temperatures over a period of time and method to make said foam, that is cost effective, does not require additional multiple process steps over conventional methods, and does not require complex flame retardant mixtures and/or high levels of flame retardants.

BRIEF SUMMARY OF THE INVENTION

The present invention is such a flame resistant flexible polyurethane foam and process for preparing said foam.

In one embodiment, the present invention is a reactive formulation for making a flame resistant flexible polyurethane foam comprising a mixture of:
  (A) an A side comprising
    (i) one or more organic isocyanate,
  and
  (B) a B side comprising:
    (ii) one or more isocyanate-reactive component,
    (iii) a flame retardant component comprising a combination of:
      (iii.a) red phosphorus in an amount greater than 6 parts by weight and equal to or less than 20 parts by weight,
      (iii.b) expandable graphite, preferably from 5 to 20 parts by weight,
      and
      (iii.c) optionally sodium citrate, preferably when present from 0.5 to 15 parts by weight,
    wherein the flame retardant component does not contain ammonium polyphosphate and parts by weight are based on the total weight of the B side,
    and
    (iv) one or more additional component selected from a catalyst, a blowing agent, a cell opener, a surfactant, a crosslinker, a chain extender, a flame retardant, a filler, a colorant, a pigment, an antistatic agent, reinforcing fibers, an antioxidant, a preservative, or an acid scavenger,
  wherein said flame resistant flexible polyurethane foam made from the reactive formulation achieves a V-0 rating at 0.5 inch according to Underwriter's Laboratories Standard 94 Flammability Test after heat aging at 150° C. for seven days.

In a preferred embodiment of the present invention, the organic isocyanate of the reactive formulation disclosed herein above comprises monomeric MDI, polymeric MDI, combinations there of, and/or liquid variants thereof obtained by introducing uretonimine and/or carbodiimide groups forming polyisocyanates, said carbodiimide and/or uretonimine modified polyisocyanates having an NCO value of from 29 to 33 percent and included in is from said polyisocyanate 1 to 45 percent by weight of 2,4'-diphenylmethane diisocyanate in the form of a monomer and/or a carbodiimidization product thereof.

In another preferred embodiment of the present invention, the isocyanate-reactive component isocyanate of the reactive formulation disclosed herein above comprises an ethyleneoxide capped polyether polyol.

Another embodiment of the present invention is a process to make a flame resistant flexible polyurethane foam by the steps of:

(I) forming:
  (A) an A side comprising:
    (i) one or more organic isocyanate,
  and
  (B) a B side comprising:
    (ii) one or more isocyanate-reactive component,
    (iii) a flame retardant component comprising a combination of:
      (iii.a) red phosphorus in an amount greater than 6 parts by weight and equal to or less than 20 parts by weight
      (iii.b) expandable graphite, preferably from 5 to 20 parts by weight,
    and
      (iii.c) optionally sodium citrate, preferably when present from 0.5 to 15 parts by weight,
    wherein the flame retardant component does not contain ammonium polyphosphate and parts by weight are based on the total weight of the B side,
  and
    (iv) one or more additional component selected from a catalyst, a blowing agent, a cell opener, a surfactant, a crosslinker, a chain extender, a flame retardant, a filler, a colorant, a pigment, an antistatic agent, reinforcing fibers, an antioxidant, a preservative, or an acid scavenger;

(II) mixing the A side and the B side together to form a reactive formulation; and (III) subjecting the resulting reactive formulation to conditions sufficient to cure the reactive formulation to form a flame resistant flexible polyurethane foam, preferably the foam is disposed around or in the vicinity of an engine of an automotive vehicle as an engine cover, an engine noise insulator, a fuel injector encapsulant, a side cover, an oil pan cover, an under cover, a hood silencer, or a dashboard silencer, wherein said foam achieves a V-0 rating at 0.5 inch according to Underwriter's Laboratories Standard 94 Flammability Test (UL 94) after heat aging at 150° C. for seven days.

In a preferred embodiment of the reactive formulation and/or process described herein above, the flame resistant flexible polyurethane foam has a density of from 80 kg/m$^3$ to 140 kg/m$^3$.

In a preferred embodiment of the reactive formulation and/or process described herein above, flame resistant flexible polyurethane foam has a tensile strength of equal to or greater than 150 kPa.

In a preferred embodiment of the reactive formulation and/or process described herein above, the flame resistant flexible polyurethane foam has an air flow resistivity of from 40,000 rayls/m to 150,000 rayls/m.

In yet another embodiment, the present invention is a flame resistant flexible polyurethane foam for use in an engine compartment of a vehicle said foam is halogen-free and ammonium polyphosphate free and has a UL 94 flammability rating after heat aging at 150° C. for seven days of V-0 at 0.5 inch, a density between 80 kg/m$^3$ and 140 kg/m$^3$, and an air flow resistivity between 40,000 rayls/m and 150,000 rayls/m.

DETAILED SUMMARY OF THE INVENTION

The flexible polyurethane foams according to the present invention are prepared from a reactive formulation comprising an A side comprising one or more organic isocyanate (i) and a B side comprising one or more isocyanate-reactive component (ii), a flame retardant component (iii) comprising a combination of red phosphorus (iii.a), expandable graphite (iii.b), and optionally sodium citrate (iii.c) wherein the flame retardant component does not contain ammonium polyphosphate, and optionally one or more additives (iv).

Suitable organic isocyanates (i) for use in the composition and process of the present invention include any of those known in the art for the preparation of polyurethane foams, like aliphatic, cycloaliphatic, araliphatic and, preferably, aromatic isocyanates, such as toluene diisocyanate in the form of its 2,4 and 2,6-isomers and mixtures thereof and diphenylmethane diisocyanate in the form of its 2,4'-, 2,2'- and 4,4'-isomers and mixtures thereof, the mixtures of diphenylmethane diisocyanates (MDI) and oligomers thereof having an isocyanate functionality greater than 2 known in the art as "crude" or polymeric MDI (polymethylene polyphenylene polyisocyanates), the known variants of MDI comprising urethane, allophanate, urea, biuret, carbodiimide, uretonimine and/or isocyanurate groups.

Preferably monomeric MDI, crude MDI, polymeric MDI, combinations thereof, and/or liquid variants thereof are obtained by introducing uretonimine and/or carbodiimide groups into said polyisocyanates, such a carbodiimide and/or uretonimine modified polyisocyanate having an NCO value of from 29 to 33 percent and includes 1 to 45 percent by weight of 2,4'-diphenylmethane diisocyanate in the form of a monomer and/or a carbodiimidization product thereof. For a good description of such carbodiimide and/or uretonimine modified polyisocyanates see U.S. Pat. No. 6,765,034, which is incorporated by reference herein in its entirety.

In the present invention, the organic isocyanate component may include one or more organic polyisocyanate, in addition to and/or in place of monomeric MDI as needed, provided other polyisocyanate compounds do not have adverse influences on the performance on the desired sound deadening, vibration management, and flame resistance properties of the flexible polyurethane foam. Typical examples of such other polyisocyanate compounds include isocyanate-terminal prepolymers which are formed by a reaction between at least one of compounds of the above-indicated monomeric MDI, and suitable active hydrogen compounds. To improve the formability and other characteristics of the obtained foam, the other polyisocyanate compounds may be selected from among organic isocyanates such as tolylene diisocyanate (TDI), isopholone diisocyanate (IPDI) and xylene diisocyanates (XDI), and modifications thereof. These isocyanates may be used in combinations of two or more types. Most preferably polyisocyanates are used which have an average isocyanate functionality of 2.1 to 3.0 and preferably of 2.2 to 2.8.

The amount of polyisocyanate that is used to make resilient flexible foam typically is sufficient to provide an isocyanate index of from 0.6 to 1.5, preferable 0.6 to 1.2, although wider ranges can be used in special cases. A preferred range is from 0.7 to 1.05 and a more preferred range is from 0.75 to 1.05.

The B side of the present invention comprises an isocyanate-reactive component (ii) which includes any type of compound of those known in the art for that purpose, for example polyamines, aminoalcohols and polyols.

Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example ethylene glycol, diethylene glycol, propylene glycol, dipropylene glycol, butane diol, glycerol, trimethylolpropane, triethanolamine, pentaerythritol, sorbitol and sucrose; polyamines, for example ethylene diamine, tolylene diamine, diaminodiphenylmethane and polymethylene polyphenylene polyamines; and aminoalcohols, for example ethanolamine and diethanolamine; and mixtures of such initiators. Other suitable polyols include polyesters obtained by the condensation of appropriate proportions of glycols and higher functionality polyols with polycarboxylic acids. Still further suitable polyols include hydroxyl terminated polythioethers, polyamides, polyesteramides, polycarbonates, polyacetals, polyolefins and polysiloxanes. Still further suitable isocyanate-reactive components include ethylene glycol, diethylene glycol, propylene glycol, dipropylene glycol, butane diol, glycerol, trimethylolpropane, ethylene diamine, ethanolamine, diethanolamine, triethanolamine and the other initiators mentioned before. Mixtures of such isocyanate-reactive components may be used as well. Most preferably polyols are used which do not comprise primary, secondary or tertiary nitrogen atoms.

Of particular importance for the preparation of the flexible polyurethane foams of the present invention are polyols and polyol mixtures having hydroxyl equivalent weight of equal to or greater than 1200, preferably equal to or greater than 1500, more preferably equal to or greater than 1700. Polyol equivalent weight is the molecular weight of the polyol divided by the hydroxyl functionality of the molecule. Of particular importance for the preparation of the flexible polyurethane foams of the present invention are polyols and polyol mixtures having hydroxyl equivalent weight of equal to or less than 4000, preferably equal to or less than 3000 and more preferably equal to or less than 2500. Polyols used for the preparation of the flexible foams of the present invention have an average nominal hydroxyl functionality of from 2 to 8, preferably of from 2 to 4.

Of particular importance for the preparation of the flexible foams are reaction products of alkylene oxides, for example ethylene oxide and/or propylene oxide, with initiators containing from 2 to 8 active hydrogen atoms per molecule. Suitable initiators include: polyols, for example ethylene glycol, diethylene glycol, propylene glycol, dipropylene glycol, butane diol, glycerol, trimethylolpropane, triethanolamine, pentaerythritol and sorbitol; polyamines, for example ethylene diamine, tolylene diamine, diaminodiphenylmethane and polymethylene polyphenylene polyamines; and aminoalcohols, for example ethanolamine and diethanolamine; and mixtures of such initiators. Other suitable polyols include polyesters obtained by the condensation of appropriate proportions of glycols and higher functionality polyols with polycarboxylic acids. Still further suitable polyols include hydroxyl terminatedpolythioethers, polyamides, polyesteramides, polycarbonates, polyacetals, polyolefins and polysiloxanes. Preferred polyols are the polyether polyols comprising ethylene oxide and/or propylene oxide units and most preferably polyoxyethylene polyoxypropylene polyols having an oxyethylene content of at least 10 percent and preferably 10 to 85 percent by weight. A preferred isocyanate-reactive component comprises an ethylene-oxide capped polyether polyol.

Other polyols which may be used comprise dispersions or solutions of addition or condensation polymers in polyols of the types described above. Such modified polyols, often referred to as "copolymer" polyols have been fully described in the prior art and include products obtained by the in situ polymerisation of one or more vinyl monomers, for example styrene and acrylonitrile, in polymeric polyols, for example polyether polyols, or by the in situ reaction between a polyisocyanate and an amino- or hydroxy-functional compound, such as triethanolamine, in a polymeric polyol.

The polymer modified polyols which are particularly interesting in accordance with the invention are products obtained by in situ polymerisation of styrene and/or acrylonitrile in polyoxyethylene polyoxypropylene polyols and products obtained by in situ reaction between a polyisocyanate and an amino or hydroxy-functional compound (such as triethanolamine) in a polyoxyethylene polyoxypropylene polyol.

Polyoxyalkylene polyols containing from 5 to 50 percent of dispersed polymer are particularly useful. Particle sizes of the dispersed polymer of less than 50 microns are preferred. Mixtures of such isocyanate-reactive components may be used as well. Most preferably polyols are used which do not comprise primary, secondary or tertiary nitrogen atoms.

The B side further comprises a flame retardant component (iii) which comprises a combination of red phosphorus (iii.a), an expandable graphite (iii.b), and optionally sodium citrate (iii.c). In a preferred embodiment, the flame retardant component does not contain ammonium polyphosphate. The red phosphorus that constructs the composition for flame retardant flexible polyurethane foam of the present invention is inorganic. The inorganic red phosphorus may be untreated or may have been surface treated by an inorganic substance and/or organic substance (referred to hereinafter as coated red phosphorus), and the like. It is especially preferable to use coated red phosphorus in terms of the stability and ease of handling. Examples of commercial red phosphorus products include NOVA RED™ and NOVA EXCEL™ available from Rin Kagaku Kogyo Co., HISHIGUARD™ available from Nippon Chemical Industries Co., and EXOLIT™ RP607 available from Clariant.

The red phosphorous can be neat, as a concentrate, or used as a mixture, solution, or a thixotropic dispersion in a carrier medium such as castor oil, diphenyloctylphosphate, tris(chloropropyl)phosphate (TCPP), etc., for example EXOLIT RP 6590 (TP) and EXOLIT RP 6580 available from Clariant.

The red phosphorus (iii.a) is present in an amount of greater than 6 parts based on the total weight of the B side, preferably equal to or greater than 7 parts, preferably equal to or greater than 8 parts, more preferably equal to or greater than 9 parts, more preferably equal to or greater than 10 parts based on the total weight of the B side. The red phosphorus (iii.a) is present in an amount of equal to or less than 25 parts based on the total weight of the B side, preferably equal to or less than 20 parts, preferably equal to or less than 15 parts, and more preferably equal to or less than 12 parts based on the total weight of the B side.

The flame retardant component (iii) further consists of an expandable graphite (iii.b) which is well known in the art. Examples include crystalline compounds that maintain the laminar structure of the carbon that has grown a graphite interlayer compound by treating natural flaky graphite, pyrolytic graphite, Kish graphite, or another such powder by concentrated sulfuric acid, nitric acid, or another such inorganic acid and concentrated nitric acid, perchloric acid, permanganic acid, bichromate, or another such strong oxidizing agent. Expandable graphite that has been neutralized by ammonia, an aliphatic lower amine, alkali metal compound, alkaline earth metal compound, or the like is preferably used. Examples of aliphatic lower amines include monomethyl amine, dimethyl amine, trimethyl amine, ethyl amine, and the like. Examples of alkali metal compounds and alkaline earth metal compounds include hydroxides, oxides, carbonates, sulfates, organic acid salts, and the like of potassium, sodium, calcium, barium, magnesium, and the like. Preferably expandable graphite flakes have a size of from 0.3 to 1.0 mm.

In one embodiment, the expandable graphite (iii.b) being used is formed of graphite, with $H_2SO_4$ or $SO_4$, for example, having two free negative valences, which attach to two free positive valences of a hydrocarbon ring, incorporated between the planes of the graphite mesh. When the flexible polyurethane foam is burned, this graphite expands to from 100 to 200 times its volume, giving off $SO_3$ and/or $SO_2$ and water. A loose, expanded mass that acts in an insulating manner thus forms. Examples of commercial expandable graphite products include NYAGRAPH™ available from Naycol Nano Technologies, Inc., CA-60S™ available from Nippon Kasei Chemical Co., and CALLOTEK™ available from Graphitwerk Kropfmuehlm AG.

The expandable graphite (iii.b) is present in an amount of equal to or greater than 5 parts based on the total weight of the B side, preferably equal to or greater than 7 parts, and more preferably equal to or greater than 10 parts based on the total weight of the B side. The expandable graphite (iii.b) is present in an amount of equal to or less than 20 parts based on the total weight of the B side, preferably equal to or less than 17 parts, and more preferably equal to or less than 15 parts based on the total weight of the B side.

The flame retardant component (iii) may optionally further consists of sodium citrate (iii.c) which is well known in the art.

If sodium citrate (iii.c) is present in the flame retardant component (iii) of the present invention it is present in an amount of equal to or greater than 0.5 parts based on the total weight of the B side, preferably equal to or greater than 1 part, and more preferably equal to or greater than 2 parts based on the total weight of the B side. If sodium citrate (iii.c) is present in the flame retardant component (iii) of the present invention it is present in an amount of equal to or less than 15 parts based on the total weight of isocyanate-reactive component, preferably equal to or less than 12 parts, and more preferably equal to or less than 10 parts based on the total weight of the B side.

In one embodiment, the A side, the B side, and/or the reactive formulation of the present invention may comprise an additional compound other than ammonium polyphosphate, including organic and/or inorganic, halogenated and/or non-halogenated, in addition to the red phosphorus (iii.a), expandable graphite (iii.b), and optionally sodium citrate (iii.c) to improve the flame resistance performance of the flexible polyurethane foam produced therefrom.

In one embodiment, the A side, the B side, the reactive formulation, the flame retardant component (iii), and/or the flexible polyurethane foam of the present invention do not comprise or contain any other flame retardant additives than the red phosphorus (iii.a), the expandable graphite (iii.b), and optionally the sodium citrate (iii.c).

In one embodiment, the A side, the B side, the reactive formulation, and/or the flame retardant component (iii) and/or the flexible polyurethane foam of the present invention do not comprise or contain any other flame retardant additives than the red phosphorus (iii.a) and the expandable graphite (iii.b).

In another embodiment, the A side, the B side, the reactive formulation, the flame retardant component (iii) and/or the flexible polyurethane foam of the present invention do not contain an organic phosphorus containing compound.

In another embodiment, the A side, the B side, the reactive formulation, the flame retardant component (iii), and/or the flexible polyurethane foam of the present invention do not comprise or contain caseine.

In another embodiment, the A side, the B side, the reactive formulation, the flame retardant component (iii), and/or the flexible polyurethane foam of the present invention do not comprise or contain a halogenated flame retardant. In other words, the A side, the B side, and/or the reactive formulation of the present invention comprise only non-halogenated flame retardants.

The reaction of the reactive formulation of the present invention comprising one or more organic polyisocyanate (i), one or more isocyanate-reactive component (ii), and the flame retardant component (iii) comprising a combination of red phosphorus (iii.a), expandable graphite (iii.b), and optionally sodium citrate (iii.c) wherein the flame retardant component does not contain ammonium polyphosphate, to make a flexible polyurethane foam can be performed in the presence of various types of other additional materials (iv), as may be useful in the particular manufacturing process that is used or to impart desired characteristics to the resulting foam. These include, for example, catalysts, blowing agents, cell openers, surfactants, crosslinkers, chain extenders, flame retardants (other than red phosphorus, expandable ammonium polyphosphate, and sodium citrate), fillers, colorants, pigments, antistatic agents, reinforcing fibers, antioxidants, preservatives, acid scavengers, and the like.

The B side may comprise one or more additional components (iv). For example, in order to prepare a flexible polyurethane foam of the present invention a blowing agent is required, preferably water. However if the amount of water is not sufficient to obtain the desired density of the foam any other known way to prepare polyurethane foams may be employed additionally, like the use of reduced or variable pressure, the use of a gas like air, $N_2$ and $CO_2$, the use of more conventional blowing agents like chlorofluorocarbons, hydrofluorocarbons, hydrocarbons and fluorocarbons, the use of other reactive blowing agents, i.e. agents which react with any of the ingredients in the reacting mixture and due to this reaction liberate a gas which causes the mixture to foam and the use of catalysts which enhance a reaction which leads to gas formation like the use of carbodiimide-formation-enhancing catalysts such as phospholene oxides. Combinations of these ways to make foams may be used as well. The amount of blowing agent may vary widely and primarily depends on the desired density. Water may be used as liquid at below-ambient, ambient or elevated temperature and as steam.

One embodiment of the present invention is a combination of blowing agent is water and $CO_2$ wherein the $CO_2$ is added to the ingredients for making the foam in the mixing head of a device for making the foam, to one of the isocyanate-reactive ingredients and preferably to the polyisocyanate before the polyisocyanate is brought into contact with the isocyanate-reactive ingredients.

In one embodiment, the flexible polyurethane foam of the present invention is made from reactive formulations comprising (A) the A side comprising an organic isocyanate (i) and (B) the B side comprising an isocyanate-reactive component (ii), and the flame retardant additive (iii) in the presence of water. Preferably, such formulations contain from 1 to 7 weight percent, especially from 1 to 6 weight percent water based on the total weight of the isocyanate-reactive component (ii). Desirable flexible polyurethane foam can be made in a slabstock process or in a closed mold. Closed mold molding processes are preferred to make shaped products such as under the hood applications, for example, engine encapsulation members.

As an additional component (iv), one or more catalyst may be present in the B side of the reactive formulation of the present invention. One preferred type of catalyst is a tertiary amine catalyst. The tertiary amine catalyst may be any compound possessing catalytic activity for the reaction between a polyol and an organic polyisocyanate and at least one tertiary amine group. Representative tertiary amine catalysts include trimethylamine, triethylamine, dimethylethanolamine, N-methylmorpholine, N-ethyl-morpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl)ether, morpholine,4,4'-(oxydi-2,1-ethanediyl)bis, triethylenediamine, pentamethyl diethylene triamine, dimethyl cyclohexyl amine, N-acetyl N,N-dimethyl amine, N-coco-morpholine, N,N-dimethyl aminomethyl N-methyl ethanol amine, N,N,N'-trimethyl-N'-hydroxyethyl bis(aminoethyl)ether, N,N-bis(3-dimethylaminopropyl)N-isopropanolamine, (N,N-dimethyl) aminoethoxy ethanol, N,N,N',N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis (propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, 1,2-ethylene piperidine and methyl-hydroxyethyl piperazine The B side of the reactive formulation may contain one or more other catalysts, in addition to or instead of the tertiary amine catalyst mentioned before. Of particular interest among these are tin carboxylates and tetravalent tin compounds. Examples of these include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, and the like.

Catalysts are typically used in small amounts. For example, the total amount of catalyst used may be 0.0015 to 5 weight percent, preferably from 0.01 to 1 weight percent based on the total weight of the isocyanate-reactive compound (II). Organometallic catalysts are typically used in amounts towards the low end of these ranges.

The B side may further comprise as one of the additional components (iv) a crosslinker, which preferably is used, if at all, in small amounts, to 2 weight percent, up to 0.75 weight percent, or up to 0.5 weight percent based on the total weight of the isocyanate-reactive compound (II). The crosslinker contains at least three isocyanate-reactive groups per molecule and has an equivalent weight, per isocyanate-reactive group, of from 30 to about 125 and preferably from 30 to 75. Aminoalcohols such as monoethanolamine, diethanolamine and triethanolamine are preferred types, although compounds such as glycerine, trimethylolpropane and pentaerythritol also can be used.

The B side may further comprise a surfactant as an additional component (iv). A surfactant is preferably included in the foam formulation to help stabilize the foam as it expands and cures. Examples of surfactants include nonionic surfactants and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters and alkyl arylsulfonic acids can also be used. The surfactants prepared by the sequential addition of propylene oxide and then ethylene oxide to propylene glycol are preferred, as are the solid or liquid organosilicones. Examples of useful organosilicone surfactants include commercially available polysiloxane/polyether copolymers such as TEGOSTAB™ B-8729, and B-8719LF available from Goldschmidt Chemical Corp., and NIAX™ L2171 surfactant from Momentive Performance Materials. Non-hydrolyzable liquid organosilicones are more preferred. When a surfactant is used, it is typically present in an amount of 0.0015 to 1 weight percent based on the total weight of the organic isocyanate (i).

A cell opener may be present as an additional component (iv) in the B side of the reactive formulation. The cell opener functions during the polymerization reaction to break cell walls and therefore promote the formation of an open cell structure. A high open cell content (at least 25 percent by number, preferably at least 50 percent) is usually beneficial for foams that are used in noise and vibration absorption applications. A useful type of cell opener includes ethylene oxide homopolymers or random copolymers of ethylene oxide and a minor proportion of propylene oxide, which have a molecular weight of 5000 or more. These cell openers preferably have a hydroxyl functionality of at least 4, more preferably at least 6. Cell openers are preferably used in amounts from about 0.5 to about 5 weight percent based on the total weight of the isocyanate-reactive compound (II).

A chain extender may be employed as an additional component (iv) in the B side of the reactive formulation of the present invention. A chain extender is a compound having exactly two isocyanate-reactive groups and an equivalent weight per isocyanate-reactive group of up to 499, preferably up to 250, also may be present. Chain extenders, if present at all, are usually used in small amounts, such as up to 10, preferably up to 5 and more preferably up to 2 weight percent based on the total weight of the isocyanate-reactive compound (II). Examples of suitable chain extenders include ethylene glycol, diethylene glycol, triethylene glycol, propylene glycol, dipropylene glycol, tripropylene glycol, 1,4-dimethylolcyclohexane, 1,4-butane diol, 1,6-hexane diol, 1,3-propane diol, diethyltoluene diamine, amine-terminated polyethers such as JEFFAMINE™ D-400 from Huntsman Chemical Company, amino ethyl piperazine, 2-methyl piperazine, 1,5-diamino-3-methyl-pentane, isophorone diamine, ethylene diamine, hexane diamine, hydrazine, piperazine, mixtures thereof and the like.

The B side may also comprise as an additional component (iv) a filler, which reduces overall cost, load bearing and other physical properties to the product. The filler may constitute up to about 50 percent, of the total weight of the polyurethane reactive formulation (i.e., the combined weight of the organic isocyanate (i), the isocyanate-reactive compound (II), and the flame retardant component (iii)). Suitable fillers include talc, mica, montmorillonite, marble, barium sulfate (barytes), milled glass granite, milled glass, calcium carbonate, aluminum trihydrate, carbon, aramid, silica, silica-alumina, zirconia, talc, bentonite, antimony trioxide, kaolin, coal based fly ash and boron nitride.

Flexible foam can be made in accordance with the invention in a slabstock process or in a closed mold molding process. Slabstock foam is formed as a large bun which is cut into the required shape and size for use. Closed mold molding processes can be either so-called hot molding process or a cold molding process wherein the foaming takes place in a closed mold. After the foam has cured, the mold is opened, and the flexible foam removed. An integral skin can be formed onto the surface of the foam in the mold. A film, fabric, leather or other coverstock can be inserted into the mold prior to introducing the reactive formulation, to produce a foam that has a desirable show surface.

Polyurethane foam formulations that contain a mixture of ethylene oxide-capped polypropylene oxides in accordance with the invention have been found to process well, especially in formulations in which water is used as a blowing agent, especially when used as the sole blowing agent as described herein above. Good processing herein refers to the ability of a foam formulation to consistently produce good quality foam in an industrial setting. Good processing is indicated by consistently uniform cell structure, complete mold filling, consistently good surface appearance, consistent foam density and consistency in foam physical properties as the foam is produced over time. The foam formulation tolerates small changes in operating temperatures, catalyst levels and other process conditions which often cause significant product inconsistencies in other high water foam formulations.

It is often preferred to crush the foam to open the cells. A high open cell content (at least 25 percent by number, preferably at least 50 percent) is usually beneficial for foams that are used in noise and vibration absorption applications.

Flexible polyurethane foam is characterized in having a resiliency, as determined using the ASTM D-3574 ball rebound test, which measures the height a ball rebounds from the surface of the foam when dropped under specified conditions. Under the ASTM test, the foam exhibits a resiliency of at least 40 percent, especially at least 50 percent. The flexible polyurethane foam of the present invention advantageously also has a density in the range of 4 to 10 pounds/cubic foot (pcf) (64-160 kg/m$^3$), preferably from 5 to 8.8 pounds/cubic foot (80-140 kg/m$^3$). Density is conveniently measured according to ASTM D 3574.

The flexible polyurethane foam of the present invention advantageously has a tensile strength in the range of 150 to 800 kPa. Preferably, the tensile strength of the foam according to the present invention is equal to or greater than 150 kPa, more preferably equal to or greater than 200 kPa, more preferably equal to or greater than 250 kPa, and even more preferably equal to or greater than 300 kPa. Preferably, the tensile strength of the foam according to the present invention is equal to or less than 800 kPa, more preferably equal to or less than 700 kPa, more preferably equal to or less than 600 kPa, and even more preferably equal to or less than 500 kPa. Tensile strength is conveniently measured according to ASTM D 3574.

The flexible polyurethane foam of the present invention advantageously achieves a UL 94 flammability rating of V-0 even after exposure to elevated temperatures for extended periods of time. For example, the flexible polyurethane foam of the present invention achieves a UL 94 flammability rating of V-0 after heat aging at 150° C. for seven days.

One means of measuring sound absorption performance of noise and vibration-absorbing applications, such as molded parts from the resilient, flexible polyurethane of the present invention, is by using equipment such as an impedance tube, or what is generally referred to as reverberation chambers, in accordance with individual OEM specifications. Another test used to evaluate sound absorption performance is air flow resistivity, according to ASTM C522-87. Preferably, for noise and vibration-absorbing applications, the air flow resistivity should be in the range of 30,000 to 200,000 rayls/m, more preferably 40,000 to 150,000 rayls/m. Rayls is pressure divided by volumetric flow rate and is equivalent to Pa/(m$^3$/s) (or Pa-s/m$^3$). Air flow resistivity is given in rayls/m which is pressure divided by the volumetric flow rate divided by the thickness of the foam specimen.

To manufacture the flame resistant flexible polyurethane foam of the present invention, a reactive formulation is prepared, said reactive formulation comprising: an A side comprising (i) one or more organic polyisocyanate and a B side comprising (ii) one or more isocyanate-reactive component, (iii) a flame retardant component comprising a combination of: (iii.a) red phosphorus, (iii.b) expandable graphite, and (iii.c) optionally sodium citrate wherein the flame retardant component does not contain ammonium polyphosphate; and (iv) one or more additional component selected from a catalyst, a blowing agent, a cell opener, a surfactant, a crosslinker, a chain extender, a flame retardant (other than red phosphorus, expandable graphite, and sodium citrate), a filler, a colorant, a pigment, an antistatic agent, reinforcing fibers, an antioxidant, a preservative, or an acid scavenger. The "B side", is a premix comprising the appropriate amounts of polyol, flame retardant component, blowing agent, catalyst, foaming aid, and other aids specific to the desired polyol component/final foam. Depending on the composition of the B side, elevated temperatures, above 40° C., may be required to mix the components. Preferably, the B side is mixed together at a temperature less than 40° C., more preferably it is mixed together at ambient temperature (defined herein as from 20° C. to 30° C.). The B side is then mixed with the specific organic (poly)isocyanate component, comprised in the "A side" at the desired ratio, forming the reactive formulation which, when mixed, allows for the foaming reaction to occur. The polyol premix (B side) and the organic polyisocyanate component (A side) are mixed together by any known urethane foaming equipment. The resulting reactive formulation is subjected to conditions sufficient to cure the reactive formulation to form a flame resistant flexible polyurethane foam which after heat aging at 150° C. for seven days obtains a UL 94 V-0 rating at 0.5 inch. The reactive formulation is either introduced into a suitable mold, so that a foaming/curing reaction takes place within the mold to form the desired polyurethane foam or it is allowed to foam/cure to form a slab stock or it is foamed in place.

The flame resistant flexible polyurethane foam thus manufactured can be suitably used for flame resistant and noise and vibration-absorbing applications according to the present invention, for example, the foams may be used for and/or molded into an article to be used for and/or molded/foamed in place as an engine cover, an engine noise insulator, a fuel injector encapsulant, a side cover, an oil pan cover, an under cover, a hood silencer, and a dashboard silencer, which are disposed around or in the vicinity of an engine of an automotive vehicle, to reduce the amount of sound or noise to be transmitted from the engine. In particular, the flame resistant flexible polyurethane foam may be suitably used and/or molded into articles to be used for or molded/foamed in place as spacers or fillers for filling gaps or spaces between the engine and the surrounding devices, or encapsulation of engine parts for attenuating the standing waves.

EXAMPLES

Comparative Examples A to E and Examples 1 to 5 comprise a reaction formulation used to provide a flexible polyurethane foam comprising a polyol component and other additives (B side) and an isocyanate component (A side). The polyol component comprises one or more polyol, catalyst, flame retardant component, cross-linking agent (diethylene glycol), blowing agent (water), silicon surfactant, black colorant wherein the components are pre mixed. In mixing the polyol component, red phosphorus is added first and expandable graphite last. All the components are added to and mixed into the B side at ambient temperature (in this case, about 23° C.). The isocyanate component comprises a carbodiimide-modified MDI with 72 weight percent 4,4'-MDI and 2 weight percent 2,4'-MDI, an equivalent molecular weight of about 145, and an isocyanate content of about 29. The polyol component and isocyanate component are molded into foam pad using a HiTech high pressure impingement mixing machine equipped with a 40 inch by 40 inch by 1 inch frame with a 20 inch by 20 inch by 1 inch mold insert. The test mold top and bottom are heated to 54° C. The B side is heated to 27° C. and the A side is heated to 27° C. The injection pressure for both the B side and A side are 2000 pounds per square inch (psi). The shot size is 680 to 750 grams (g) and the shot time is 2.25 to 2.45 seconds (s). The cure time is 3 minutes (min). After the foam has cured, the mold is opened, and the foam is removed from the mold.

The composition of the polyol component (B side) for Comparative Examples A to E and each Examples 1 to 5 are listed in Table 1.

For Comparative Example A and E and Examples 1 to 5 a formulated polyol blend (comprising polyols and other additives) is made from the following components. Amounts are given as weight percent based on the total weight of the formulated polyol blend. The amounts for the components making up the polyol component (B) are given in parts based on the total weight of the polyol component (B). The ratio of the polyol component (B) and the isocyanate component (A) are given parts. In Table 1:

"Polyol-1" is a glycerin initiated propylene oxide polyol having a hydroxyl number of 56 and an equivalent weight of 1,000 available as VORANOL™ 2100 Polyol from The Dow Chemical Company;

"Polyol-2" is a glycerine initiated propylene oxide and 15 percent ethylene oxide capped polyol having a hydroxyl number of 27.5 and an equivalent weight of 2040 available as VORANOL CP 6001 Polyol from The Dow Chemical Company;

"Isocyanate" is a carbodiimide-modified MDI with 72 weight percent 4,4'-MDI and 2 weight percent 2,4'-MDI, an equivalent molecular weight of about 145, and an isocyanate content of about 29 available as Isocyanate 143 LM from The Dow Chemical Company;

"DEG" is diethylene glycol;

"TEGOSTAB™ B 4113" is a low efficiency cell regulating type silicon surfactant available from Goldschmidt Gmbh;

"DABCO™ 33 LV" is a 33 percent triethylene diamine in dipropylene glycol curing catalyst available from Air Products;

"DABCO BL 11" is a 70 percent bis(N,N dimethylaminoethyl)ether in dipropylene glycol blowing catalysts available from Air Products;

"Black" is a black colorant available as POP 4654 Black from Day Glo;

"EXOLIT AP 462" is a 30 percent by weight ammonium polyphosphate flame retardant available from Clariant Pigment and Additive Division;

"EXOLIT RP 607" is microencapsulated red phosphorus flame retardant available from Clariant Pigment and Additive Division;

"NYAGRAPH FP" is an expandable graphite having an initial expansion temperature of 200° C. and an expansion volume of 180 milliliters per gram (ml/g) available from Naycol Nano Technologies, Inc.;

"NYAGRAPH 351" is an expandable graphite having an initial expansion temperature of 150° C. and an expansion volume of 350 ml/g available from Naycol Nano Technologies, Inc.;

"Sodium Citrate" is sodium citrate dehydrate available from Fisher Scientific.

Properties for the resultant foams from the formulated polyol mixtures of Comparative Examples A and B and Example 1 are provided in Table 1. In Table 1:

"Processability" is determined visually, according to the appearance of the molded pad and by assessing the "free-rise" foaming characteristics (e.g. does the mixture foam, how fast does the foam rise, does the foam collapse at all);

"Isocyanate Index" is the ratio of the actual amount of isocyanate relative to the theoretical amount of isocyanate required to react with the polyol component;

"Density" is determined according to ASTM D3574 and is reported in kilograms per cubit meter (kg/m$^3$);

"Air Flow Resistivity" is determined according to ASTM C522-87 and is reported in rayls/m;

"Tensile Strength" is determined according to ASTM D3574 and reported in kilopascals (kPa);

"Elongation" is tensile elongation at break and is determined according to ASTM D3574 and is reported in percent (%);

"Tear Strength" is determined according to ASTM D3574 and is reported in Newtons per meter (N/m); and "UL 94" is vertical flammability testing run according to Underwriter's Laboratories Standard 94 and 0.5 inch by 0.5 inch by 5 inch foam samples, samples not meeting/failing the requirements for UL 94 are not rated (NR). Samples are tested according to UL 94 protocol as molded (e.g., at ambient temperature for at least 24 hours) and after aging at 150° C. for 7 days (samples at ambient temperature for at least 24 hours after aging and before testing).

TABLE 1

| | Comparative Example | | | | | Example | | | | |
|---|---|---|---|---|---|---|---|---|---|---|
| | A | B | C | D | E | 1 | 2 | 3 | 4 | 5 |
| POLYOL COMPONENT (B side) | | | | | | | | | | |
| VORANOL 2100 | 80.959 | | | | | | | | | |
| VORANOL CP 6001 | | 80.959 | 80.959 | 82.377 | 88.582 | 86.945 | 85.367 | 83.845 | 80.595 | 94.074 |
| DEG | 1.619 | 1.619 | 1.619 | 1.647 | 1.771 | 1.738 | 1.707 | 1.676 | 1.619 | 1.881 |
| TEGOSTAB B 4113 | 0.404 | 0.404 | 0.404 | 0.412 | 0.443 | 0.434 | 0.427 | 0.419 | 0.404 | 0.47 |
| DABCO 33 LV | 0.81 | 0.81 | 0.81 | 0.824 | 0.886 | 0.87 | 0.854 | 0.839 | 0.81 | 0.941 |
| DABCO BL 11 | 0.162 | 0.162 | 0.162 | 0.165 | 0.177 | 0.174 | 0.171 | 0.168 | 0.162 | 0.188 |

TABLE 1-continued

| Comparative Example | A | B | C | D | E | 1 | 2 | 3 | 4 | 5 |
|---|---|---|---|---|---|---|---|---|---|---|
| Black | 0.081 | 0.081 | 0.081 | 0.082 | 0.089 | 0.087 | 0.085 | 0.084 | 0.081 | 3.75 |
| EXOLIT AP 462 | 6.885 | 6.885 | 6.885 | | | | | | | |
| EXOLIT RP 607 | 1.721 | 1.721 | 1.721 | | | 1.848 | 3.63 | 5.348 | 1.721 | 7 |
| NYAGRAPH FP | 5.164 | 5.164 | | 5.254 | 5.65 | 5.545 | 5.445 | 5.348 | 5.164 | |
| NYAGRAPH 351 | | | 5.164 | | | | | | | 7 |
| Sodium Citrate | | | | 7.005 | | | | | 6.885 | |
| Water | 2.196 | 2.196 | 2.196 | 2.235 | 2.403 | 2.359 | 2.316 | 2.275 | 2.196 | 2.696 |
| TOTAL | 100 | 100 | 100 | 100 | 100 | 100 | 100 | 100 | 100 | |
| ISOCYANATE COMPONENT (A side) | | | | | | | | | | |
| Isocyanate | 100 | 100 | 100 | 100 | 100 | 100 | 100 | 100 | 100 | 100 |
| RATIO B side: A side | | | | | | | | | | |
| B side, parts | 39.053 | 44.516 | 44.516 | 45.295 | 48.707 | 47.807 | 46.939 | 46.103 | 44.515 | 45.0 |
| A side, parts | 100 | 100 | 100 | 100 | 100 | 100 | 100 | 100 | 100 | 100 |
| Isocyanate index | 0.95 | 0.95 | 0.95 | 0.95 | 0.95 | 0.95 | 0.95 | 0.95 | 0.95 | .95 |
| PROCESSABILITY | Poor | Good | Good | Good | Good | Good | Good | Good | Good | |
| PROPERTIES | | | | | | | | | | |
| Density, kg/m³ | | 115 | 116 | | 112 | 116 | 121 | 116 | 118 | |
| Air Flow Resistivity, rayls/m | | 86,719 | 122,97 | | 69,670 | 79,996 | 75,823 | 73,333 | 68,365 | |
| Tensile Strength, kPa | 148 | 349 | 354 | 383 | 384 | 450 | 409 | 388 | 370 | |
| Tensile Elongation, % | 37 | 165 | 163 | 181 | 182 | 171 | 167 | 173 | 171 | |
| Tear Strength, N/m | 448 | 934 | 904 | 832 | 929 | 970 | 922 | 897 | 880 | |
| UL 94 @ 0.5 inch, @ as molded | NR | V-0 | V-0 | NR | NR | V-0 | V-0 | V-0 | V-0 | V-0 |
| UL 94 @ 0.5 inch, @ 150° C. for 7 days | NR | NR | NR | NR | NR | NR | NR | NR | NR | V-0 |

The invention claimed is:

1. A reactive formulation for making a flame resistant flexible polyurethane foam consisting of a mixture of:
 (A) an A side consisting of:
  (i) one or more organic isocyanate selected from MDI, polymeric MDI, combinations thereof, and/or liquid variants thereof obtained by introducing uretonimine and/or carbodiimide groups forming polyisocyanates, said carbodiimide and/or uretonimine modified polyisocyanates having an NCO value of from 29 to 33 percent and included in said polyisocyanate is from 1 to 45 percent by weight of 2,4'-diphenylmethane diisocyanate in the form of a monomer and/or a carbodiimidization product thereof,
 and
 (B) a B side consisting of:
  (ii) one or more isocyanate-reactive component ethylene-oxide capped polyether polyol wherein the polyether polyol is the reaction product of ethylene oxide and propylene oxide,
  (iii) a flame retardant component consisting of a combination of:
   (iii.a) red phosphorus in an amount greater than 6 parts by weight and equal to or less than 20 parts by weight,
   (iii.b) expandable graphite,
   and
   (iii.c) optionally sodium citrate,
  wherein the flame retardant component does not contain ammonium polyphosphate and wherein parts by weight are based on the total weight of the B side,
  and
  (iv) one or more additional component selected from a catalyst, a blowing agent, a cell opener, a surfactant, a crosslinker, a chain extender, a flame retardant, a filler, a colorant, a pigment, an antistatic agent, reinforcing fibers, an antioxidant, a preservative, or an acid scavenger,
wherein said flame resistant flexible polyurethane foam made from the reactive formulation has a density of 80 kg/m3 to 140 kg/m3 and achieves a V-0 rating at 0.5 inch according to Underwriter's Laboratories Standard 94 Flammability Test after heat aging at 150° C. for seven days.

2. The reactive formulation of claim 1 wherein the expandable graphite (iii.b) is present in an amount of from 5 to 20 parts by weight, wherein parts by weight are based on the total weight of the B side.

3. The composition of claim 2 wherein the flame retardant component further comprises:
 (iii.c) from 0.5 to 15 parts by weight sodium citrate,
wherein parts by weight are based on the total weight of the B side.

4. A process to make a flame resistant flexible polyurethane foam by the steps of:
 (I) forming:
  (A) an A side consisting of:
   (i) one or more organic isocyanate selected from MDI, polymeric MDI, combinations thereof, and/or liquid variants thereof obtained by introducing uretonimine and/or carbodiimide groups forming polyisocyanates, said carbodiimide and/or uretonimine modified polyisocyanates having an NCO value of from 29 to 33 percent and included in said polyisocyanate is from 1 to 45 percent by weight of 2,4'-diphenylmethane diisocyanate in the form of a monomer and/or a carbodiimidization product thereof,
  and
  (B) a B side consisting of:
   (ii) one or more ethylene-oxide capped polyether polyol wherein the polyether polyol is the reaction product of ethylene oxide and propylene oxide,
   (iii) a flame retardant component consisting of a combination of:
    (iii.a) red phosphorus in an amount greater than 6 parts by weight and equal to or less than 20 parts by weight, (iii.b) expandable graphite,
and
(iii.c) optionally sodium citrate,
wherein the flame retardant component does not contain ammonium polyphosphate and wherein parts by weight are based on the total weight of the B side,
and
(iv) one or more additional component selected from a catalyst, a blowing agent, a cell opener, a surfactant, a crosslinker, a chain extender, a flame retardant, a filler, a colorant, a pigment, an antistatic agent, reinforcing fibers, an antioxidant, a preservative, or an acid scavenger;
(II) mixing the A side and the B side together to form a reactive formulation;
and
(III) subjecting the resulting reactive formulation to conditions sufficient to cure the reactive formulation to form a flame resistant flexible polyurethane foam
wherein said foam has a density of 80 kg/m3 to 140 kg/m3 and achieves a V-0 rating at 0.5 inch according to Underwriter's Laboratories Standard 94 Flammability Test after heat aging at 150° C. for seven days.

5. The process of claim 4 wherein the flame resistant flexible polyurethane foam has a tensile strength of equal to or greater than 150 kPa.

6. The process of claim 4 wherein the flame resistant flexible polyurethane foam has an air flow resistivity of from 40,000 rayls/m to 150,000 rayls/m.

7. The process of claim 4 wherein the flame resistant flexible polyurethane foam is disposed around or in the vicinity of an engine of an automotive vehicle as an engine cover, an engine noise insulator, a fuel injector encapsulant, a side cover, an oil pan cover, an under cover, a hood silencer, or a dashboard silencer.

8. A flame resistant flexible polyurethane foam for use in an engine compartment of a vehicle said foam is halogen-free and ammonium polyphosphate free and has a UL 94 flammability rating after heat aging at 150° C. for seven days of V-0 at 0.5 inch, a density between 80 kg/m3 and 140 kg/m3, and an air flow resistivity between 40,000 rayls/m and 150,000 rayls/m wherein said foam is made from the reactive formulation of claim 1.

* * * * *